US012201157B2

(12) United States Patent
Batista et al.

(10) Patent No.: US 12,201,157 B2
(45) Date of Patent: Jan. 21, 2025

(54) AEROSOL GENERATING DEVICE WITH VISUAL FEEDBACK DEVICE

(71) Applicant: Altria Client Services LLC, Richmond, VA (US)

(72) Inventors: Rui Nuno Batista, Morges (CH); Stephane Antony Hedarchet, Pully (CH)

(73) Assignee: Altria Client Services LLC, Richmond, VA (US)

( * ) Notice: Subject to any disclaimer, the term of this patent is extended or adjusted under 35 U.S.C. 154(b) by 0 days.

(21) Appl. No.: 18/394,906

(22) Filed: Dec. 22, 2023

(65) Prior Publication Data

US 2024/0179805 A1 May 30, 2024

Related U.S. Application Data

(63) Continuation of application No. 17/060,877, filed on Oct. 1, 2020, now Pat. No. 11,856,654, which is a (Continued)

(30) Foreign Application Priority Data

Apr. 29, 2016 (EP) .................................... 16167811

(51) Int. Cl.

*A24F 40/50* (2020.01)
*A24D 1/20* (2020.01)

(Continued)

(52) U.S. Cl.

CPC ................ *A24F 40/50* (2020.01); *A24D 1/20* (2020.01); *A24F 40/60* (2020.01); *A24F 40/65* (2020.01);

(Continued)

(58) Field of Classification Search

CPC ..... H05B 1/0227; H05B 1/0244; A24F 47/00; A24F 47/008; A24F 40/50; A24F 40/65; A24F 40/46; A24F 40/20

See application file for complete search history.

(56) References Cited

U.S. PATENT DOCUMENTS

| | | | |
|---|---|---|---|
| 5,060,671 | A | 10/1991 | Counts et al. |
| 5,249,586 | A | 10/1993 | Morgan et al. |

(Continued)

FOREIGN PATENT DOCUMENTS

| | | | |
|---|---|---|---|
| CN | 103704886 | A | 4/2014 |
| CN | 204070551 | U | 1/2015 |

(Continued)

OTHER PUBLICATIONS

European Search Report 16167811.5 dated Feb. 2, 2017.

(Continued)

*Primary Examiner* — Brian W Jennison

(74) *Attorney, Agent, or Firm* — Harness, Dickey & Pierce, P.L.C.

(57) ABSTRACT

An aerosol-generating device may comprise an electrical power supply, a housing defining a cavity for receiving an aerosol-generating article, at least one electrical heater within the cavity, and/or a controller configured to control a supply of electrical power from the electrical power supply to the at least one electrical heater. The controller is configured to activate the at least one electrical heater for a total time period when an aerosol-generating article is received within the cavity. The aerosol-generating device may also comprise a segmented visual feedback device, wherein a plurality of segments of the segmented visual feedback device each correspond to a portion of the total time period. Each of the plurality of segments is configured to provide visual feedback when an aerosol-generating article is (Continued)

received within the cavity and when the corresponding portion of the total time period has elapsed.

20 Claims, 4 Drawing Sheets

Related U.S. Application Data continuation of application No. 15/496,808, filed on Apr. 25, 2017, now Pat. No. 10,849,360, which is a continuation of application No. PCT/EP2017/058462, filed on Apr. 7, 2017.

(51) Int. Cl.

| | |
|---|---|
| ***A24F 40/20*** | (2020.01) |
| ***A24F 40/46*** | (2020.01) |
| ***A24F 40/60*** | (2020.01) |
| ***A24F 40/65*** | (2020.01) |
| ***H05B 1/02*** | (2006.01) |

(52) U.S. Cl.

CPC ............ *H05B 1/0227* (2013.01); *A24F 40/20* (2020.01); *A24F 40/46* (2020.01)

(56) References Cited

U.S. PATENT DOCUMENTS

| | | | |
|---|---|---|---|
| 5,269,327 | A | 12/1993 | Counts et al. |
| 5,388,594 | A | 2/1995 | Counts et al. |
| 5,865,185 | A | 2/1999 | Collins et al. |
| 5,930,026 | A | 7/1999 | Jacobson et al. |
| 5,967,148 | A | 10/1999 | Harris et al. |
| 6,040,560 | A | 3/2000 | Fleischhauer et al. |
| 9,078,473 | B2 | 7/2015 | Worm et al. |
| 2008/0092912 | A1 | 4/2008 | Robinson et al. |
| 2009/0283103 | A1 | 11/2009 | Nielsen et al. |
| 2011/0265806 | A1 | 11/2011 | Alarcon et al. |
| 2012/0048266 | A1 | 3/2012 | Alelov |
| 2012/0199146 | A1 | 8/2012 | Marangos |
| 2013/0319439 | A1 | 12/2013 | Gorelick et al. |
| 2014/0000638 | A1 | 1/2014 | Sebastian et al. |
| 2014/0060554 | A1 | 3/2014 | Collett et al. |
| 2014/0123990 | A1 | 5/2014 | Timmermans |
| 2014/0209105 | A1 | 7/2014 | Sears et al. |
| 2014/0261487 | A1 | 9/2014 | Chapman et al. |
| 2015/0040925 | A1 | 2/2015 | Saleem et al. |
| 2015/0181936 | A1 | 7/2015 | Lyubomirskiy et al. |
| 2015/0245656 | A1 | 9/2015 | Memari et al. |
| 2015/0272220 | A1 | 10/2015 | Spinka et al. |
| 2015/0272222 | A1 | 10/2015 | Spinka et al. |
| 2015/0272225 | A1 | 10/2015 | Worm et al. |
| 2016/0029693 | A1 | 2/2016 | Klein et al. |
| 2017/0143042 | A1 | 5/2017 | Batista et al. |

FOREIGN PATENT DOCUMENTS

| | | | |
|---|---|---|---|
| CN | 204207068 | U | 3/2015 |
| CN | 204377918 | U | 6/2015 |
| CN | 204670381 | U | 9/2015 |
| EP | 0430566 | A2 | 6/1991 |
| EP | 0503767 | A1 | 9/1992 |
| JP | 2574716 | B2 | 1/1997 |
| JP | 3258657 | B2 | 2/2002 |
| JP | 2013-524835 | A | 6/2013 |
| JP | 2014-525237 | A | 9/2014 |
| JP | 2015-532828 | A | 11/2015 |
| JP | 2016-509481 | A | 3/2016 |
| JP | 2016-512033 | A | 4/2016 |
| JP | 2017-520245 | A | 7/2017 |
| JP | 2019-510489 | A | 4/2019 |
| JP | 2019-519198 | A | 7/2019 |
| KR | 10-0178387 | B1 | 8/1991 |
| WO | WO-9639879 | A1 | 12/1996 |
| WO | WO-2012061438 | A2 | 5/2012 |
| WO | WO-2013022936 | A1 | 2/2013 |
| WO | WO-2015/140312 | A1 | 9/2015 |
| WO | WO-2015/149406 | A1 | 10/2015 |
| WO | WO-2016/005601 | A1 | 1/2016 |
| WO | WO-2016/062777 | A1 | 4/2016 |

OTHER PUBLICATIONS

Partial International Search and Written Opinion dated Jul. 5, 2017 for corresponding International Application No. PCT/EP2017/058462.
LCD meter for wattage in e-Cigs and Vaping Systems, https://www.eleafworld.co.uk/LCD-meter.
LCD meter for voltage in e-Cigs and Vaping Systems, http://www.alibaba.com/product-detail/2015-ismoka-eleaf-mini-istick-LED_60134978414.html.
International Preliminary Report on Patentability for corresponding International Application No. PCT/EP2017/058462 dated Nov. 8, 2018.
International Preliminary Report on Patentability for Application No. PCT/EP2017/076508 dated May 23, 2019.
Third Party Observation dated May 13, 2020 for corresponding European Application No. 17715202.2.
Japanese Third Party Observation dated Jun. 17, 2020 for corresponding Japanese Application No. 2018-553144.
Russian Office Action and Search Report dated May 27, 2020 for corresponding Russian Application No. 2018137999.
International Search Report and Written Opinion thereof dated Oct. 18, 2017 for corresponding International Application No. PCT/EP2017/058462.
Russian Notice of Allowance dated Sep. 1, 2020 for corresponding Russian Application No. 2018137999/28(063016).
Office Action issued Dec. 2, 2020 in counterpart Chinese Application No. 201780022929.6.
Japanese Office Action for corresponding Japanese Patent Application No. 2018-553144 issued on Mar. 25, 2021 and English translation thereof.
JP Office Action dated Oct. 11, 2021 issued in corresponding Japanese Patent Application No. 2018-553144.
KR Office Action for South Korean Application No. 10-2018-7030260 dated Dec. 17, 2021.
Japanese Pre-Appeal Review Report for Japanese Patent Application No. 2018-553144 issued on Apr. 22, 2022 and English translation thereof.
KR Notice of Allowance for corresponding South Korean Application No. 10-2018-7030260 dated Jun. 28, 2022 and English translation thereof.
Japanese Office Action for Japanese Patent Application No. 2018-553144 issued on Nov. 14, 2022 and English translation thereof.
Japanese Office Action for corresponding Japanese Patent Application No. 2022-019577 issued on Mar. 13, 2023 and English translation thereof.
EP Notice of Opposition for European Patent No. 3448184 mailed on Apr. 28, 2023.
EP Grounds of Opposition for European Patent No. 3448184 mailed on May 3, 2023.
Japanese Notice of Allowance for Japanese Patent Application No. 2022-019577 issued on Nov. 20, 2023 and English translation thereof.
Japanese Office Action for Japanese Patent Application No. 2023-214503 issued on Oct. 15, 2024 and English translation thereof.

AEROSOL GENERATING DEVICE WITH VISUAL FEEDBACK DEVICE

CROSS-REFERENCE TO RELATED APPLICATIONS

This is a continuation of and claims the benefit of priority to U.S. application Ser. No. 17/060,877, filed on Oct. 1, 2020, which is a continuation of and claims the benefit of priority to U.S. application Ser. No. 15/496,808, filed on Apr. 25, 2017, which is a continuation of and claims the benefit of priority to PCT/EP2017/058462, filed on Apr. 7, 2017, and further claims the benefit of priority to EP 16167811.5, filed on Apr. 29, 2016, the contents of each of which are hereby incorporated by reference in their entirety.

BACKGROUND

Field

The present disclosure relates to an aerosol-generating device comprising a segmented visual feedback device. The device may be used in an electrically operated smoking system.

Description of Related Art

One type of aerosol-generating system is an electrically operated smoking system. Known handheld electrically operated smoking systems typically comprise an aerosol-generating device comprising a battery, control electronics, and an electric heater for heating an aerosol-generating article designed specifically for use with the aerosol-generating device. In some examples, the aerosol-generating article comprises an aerosol-generating substrate, such as a tobacco rod or a tobacco plug, and the heater contained within the aerosol-generating device is inserted into or around the aerosol-generating substrate when the aerosol-generating article is inserted into the aerosol-generating device. In an alternative electrically operated smoking system, the aerosol-generating article may comprise a capsule containing an aerosol-generating substrate, such as loose tobacco.

Some electrically operated smoking systems include a simple visual feedback device to provide basic information, such as an indication of when the device is switched on and an indication of when a heating cycle has finished.

Some electronic smoking devices have a simple LED unit that indicates when the device is almost empty of a liquid substrate.

Some electronic smoking devices comprise a plurality of indicators to indicate the number of puffs taken or an estimate of the number of puffs remaining. However, since each puff may vary in flow rate and duration, such feedback is of limited use.

Some smoking systems comprise a smoking device and a replaceable tobacco flavour unit. The tobacco flavour unit may comprise an indicating means for indicating when the unit has already been heated, but it does not provide any feedback during the operation of the smoking system.

SUMMARY

According to some example embodiments, there is provided an aerosol-generating device comprising an electrical power supply, a housing defining a cavity for receiving at least part of an aerosol-generating article, and at least one electrical heater positioned within the cavity. The aerosol-generating device further comprises a controller configured to control a supply of electrical power from the electrical power supply to the at least one electrical heater to activate the at least one electrical heater. The controller is configured to activate the at least one electrical heater for a total time period when at least part of an aerosol-generating article is received within the cavity. The aerosol-generating device also comprises a segmented visual feedback device, wherein a plurality of segments of the segmented visual feedback device each correspond to a different portion of the total time period. Each of the plurality of segments is configured to provide a visual feedback when at least part of an aerosol-generating article is received within the cavity and when the corresponding portion of the total time period has elapsed.

Aerosol-generating devices according to some example embodiments are configured to heat an aerosol-generating article for a total time period. The aerosol-generating device may be configured to heat an aerosol-generating article until one or more aerosol-forming substrates on the aerosol-generating article has been depleted. The controller may be configured to continuously activate the at least one heater for the total time period, so that the total time period is equal to the time period during which the at least one heater is continuously activated. The controller may be configured to activate the at least one heater in a series of discrete activations until the one or more aerosol-forming substrates have been depleted. For example, the controller may be configured to activate the at least one heater only when a negative pressure is applied to the aerosol-generating device or an aerosol-generating article received within the aerosol-generating device. In such example embodiments, the total time period is equal to the sum of the time period over which the at least one heater is activated during each activation.

In an example embodiment, providing a segmented visual feedback device in which each of a plurality of segments is configured to provide a visual feedback after a different portion of the total time period has elapsed provides a clear indication of the remaining heater activation time. The segmented visual feedback device may provide an accurate indication of the level of depletion of an aerosol-forming substrate on an aerosol-generating article being heated with the aerosol-generating device. This is in contrast to known devices that either provide no feedback of the level of depletion or provide only an estimate based on a number of puffs, for example.

The at least some of the different portions of the total time period may partially overlap. The different portions of the total time period may be consecutive portions of the total time period.

The segmented visual feedback device may comprise at least one segment configured to provide a visual feedback at the start of the total time period. For instance, the segmented visual feedback device may comprise at least one segment configured to provide visual feedback before any portion of the total time period has elapsed. In an example embodiment, the remaining segments of the segmented visual feedback device are the plurality of segments each configured to correspond to a different portion of the total time period.

All of the segments of the visual feedback device may be the plurality of segments each configured to correspond to a different portion of the total time period.

The at least one electrical heater may comprise a plurality of electrical heaters.

The controller may be configured to simultaneously activate all of the electrical heaters each time the heaters are activated during the total time period.

In another instance, the controller may be configured to sequentially activate the plurality of electrical heaters. The controller may be configured to activate and deactivate the plurality of electrical heaters one at a time. The controller may be configured to activate the plurality of electrical heaters in two or more groups, wherein all of the electrical heaters within a group are activated at the same time. The controller may be configured to activate the next heater or group of heaters after the previous heater or group of heaters has been activated but before the previous heater or group of heaters has been deactivated.

In example embodiments in which the controller is configured to sequentially activate a plurality of electrical heaters, each of the plurality of segments may be configured to provide visual feedback when a corresponding electrical heater or group of electrical heaters has been activated for a period of time. The period of time may be the total activation time for the heater or group of electrical heaters. The period of time may be a portion of the total activation time for the electrical heater or group of electrical heaters.

Each portion of the total time period may correspond to the total activation time of a single electrical heater, such that each of the plurality of segments is configured to provide visual feedback when at least part of an aerosol-generating article is received within the cavity and when the corresponding electrical heater has been activated.

The electrical heaters may be arranged in a pattern, wherein the segments of the segmented visual feedback device are arranged in the same pattern as the electrical heaters. Providing the electrical heaters and the segments of the segmented visual feedback device in the same pattern may further highlight the correlation between each of the plurality of segments and the depletion of an aerosol-forming substrate.

The pattern of the electrical heaters and the segments of the segmented visual feedback device may include, but is not limited to, a grid of linear rows and columns, a grid of linear rows with offset columns, a two-dimensional honeycomb, one or more concentric circles, and combinations thereof.

Each of the plurality of segments may be transformable from a first condition to a second condition when at least part of an aerosol-generating article is received within the cavity and when the corresponding portion of the total time period has elapsed.

The first condition may be the same for all of the plurality of segments. The first condition for at least one of the segments may be different from the first condition for the remaining segments.

The second condition may be the same for all of the plurality of segments. The second condition for at least one of the segments may be different from the second condition for the remaining segments.

The visual feedback provided by each of the plurality of segments in the second condition may vary between segments of the segmented visual feedback device so that the segmented visual feedback device displays an indicia when at least some of the plurality of segments have been transformed to the second condition. The indicia may comprise at least one of a graphical message and a text-based message. The indicia may include a logo, such as a brand logo. The indicia may include a brand name. When all of the of the plurality of segments have been transformed to the second condition, the variation in the second condition for at least some of the segments may provide a text-based message indicating that the aerosol-forming substrate has been depleted.

The segmented visual feedback device may be configured to transform the plurality of segments to the second condition in a non-consecutive sequence so that the segmented visual feedback device displays an indicia when some of the segments have been transformed to the second condition and some of the segments remain in the first condition.

The segmented visual feedback device may comprise a segmented electronic display, wherein each of the plurality of display segments of the segmented electronic display is individually switchable, and wherein the controller is configured to switch each of the plurality of display segments from the first condition to the second condition when at least part of an aerosol-generating article is received within the cavity and when the corresponding portion of the total time period has elapsed.

The segmented visual feedback device may comprise an LED array, wherein each segment comprises one or more LEDs.

The segmented visual feedback device may comprise an LCD display, wherein each segment of the segmented visual feedback device comprises one or more segments of the LCD display.

Each segment of the electronic display may be switchable between at least one of different levels of brightness and different colours. The first condition may comprise at least one of a first level of brightness or a first colour. The second condition may comprise at least one of a second level of brightness or a second colour. One of the first and second levels of brightness may be a state in which the segment is switched off.

In the first condition, all of the plurality of segments may be switched off. Each of the plurality of segments may be transformed into the second condition by switching on the segment when the corresponding portion of the total time period has elapsed.

In the first condition, all of the plurality of segments may be switched on. At least one segment of the electronic display may be transformed into the second condition by switching off the segment when the corresponding portion of the total time period has elapsed. All of the plurality of segments may be transformed into the second condition by switching off each segment when the corresponding portion of the total time period has elapsed.

At least one segment of the electronic display may be transformed into the second condition by changing the colour of the segment when the corresponding portion of the total time period has elapsed. All of the plurality of segments may be transformed into the second condition by changing the colour of each segment when the corresponding portion of the total time period has elapsed.

The controller may be configured to switch at least some of the plurality of segments into a third condition when at least part of an aerosol-generating article is received within the cavity and when the total time period has elapsed, wherein the third condition is different from the first condition and the second condition. Switching at least some of the plurality of segments into a third condition may provide a clear indication that an aerosol-forming substrate has been depleted. In example embodiments in which each of the plurality of segments is switched off when transformed into the second condition, transforming at least some of the segments into a third condition may comprise switching on at least some of the segments. In example embodiments in which each segment is switched on when transformed into the second condition, transforming at least some of the segments into a third condition may comprise switching off at least some of the segments. Transforming at least some of the plurality of segments into a third condition may comprise changing a colour of at least some of the segments. Transforming at least some of the segments into a third condition may comprise at least two of switching on at least one segment, switching off at least one segment, and changing a colour of at least one segment.

For example, all of the plurality of segments may be switched on and illuminated in a first colour when in the first condition. Each segment may be switched off when transformed into the second condition. After the total time period has elapsed, at least one of the segments may be switched on when transformed into the third condition. In the third condition, at least one of the segments may be illuminated in a second colour that is different from the first colour.

The controller may be configured to reset each segment of the electronic display to the first condition when a new aerosol-generating article is received within the cavity.

As described herein, the at least one electrical heater may comprise a plurality of electrical heaters, wherein each segment of the segmented visual feedback device provides visual feedback when a corresponding electrical heater has been activated. Each segment of the segmented visual feedback device may overlie the corresponding electrical heater so that an aerosol-generating article is positioned between the plurality of electrical heaters and the segmented visual feedback device when the aerosol-generating article is received within the cavity. This may further highlight the correlation between each segment of the visual feedback device and the depletion of an aerosol-forming substrate.

Each of the plurality of segments may comprise a lens arranged so that a portion of an aerosol-generating article is visible through the lens when the aerosol-generating article is received within the cavity. Each lens may be transformable between a first condition and a second condition, wherein the shape of the lens in the second condition is different from the shape of the lens in the first condition. Changing the shape of the lens may change a visual appearance of an underlying portion of an aerosol-generating article when viewed through the lens, which may provide visual feedback indicative of the activation of the corresponding electrical heater.

Each lens may be electronically activated. Each lens may comprise a piezoelectric actuator configured to change a shape of the lens when electrical power is supplied to the piezoelectric actuator. The controller may be configured to electronically actuate each lens to transform the lens from the first condition into the second condition when the corresponding electrical heater is activated.

Each lens may comprise a thermomechanical material configured to exhibit a change in shape when heated. Each lens may be configured so that heat from the corresponding electrical heater effects the change in shape of the lens to transform the lens into the second condition when the electrical heater is activated. Examples of suitable thermomechanical materials include thermoresponsive polymers comprising structurally modified polyvinyl alcohol. Suitable structurally modified polyvinyl alcohol includes polyvinyl alcohol that has been at least one of partially acetalized and ionized. Each lens may be formed from a thermomechanical material, such as a thermoresponsive polymer. Each lens may be formed from an optical material, such as glass, and a thermoresponsive polymer coating provided on the optical material.

In example embodiments in which each of the plurality of segments overlies the corresponding electrical heater, each of the plurality of segments may be configured to exhibit a change in physical appearance of the segment when the segment is heated by the corresponding electrical heater. This may provide a direct correlation between activation of each electrical heater and the transformation of the corresponding segment of the segmented visual feedback device into the second condition.

At least one segment of the plurality of segments may comprise a thermochromic material configured to exhibit a change in colour when heated by the corresponding electrical heater. Each of the plurality of segments may comprise a thermochromic material, wherein each segment is configured to change from a first colour to a second colour. One of the first and second colours may be colourless. The second colour may be the same for all of the segments. The second colour for at least one of the segments may be different from the second colour for the remaining segments. The second colour for two or more of the segments may be different from the second colour for the remaining segments. Providing segments configured to exhibit different colour changes can facilitate the segmented visual feedback device displaying an indicia when at least some of the plurality of segments have been heated. The indicia may comprise at least one of a graphic, text, a logo, and a brand name. Suitable thermochromic materials include leuco dyes.

At least one segment of the plurality of segments may comprise a thermomechanical material configured to exhibit a change in shape when heated by the corresponding electrical heater. Each segment comprising a thermomechanical material may be a lens as described herein.

At least one segment of the plurality of segments may comprise a material configured to exhibit a change in at least one of a transparency of the material and a polarizing effect of the material when the material is heated by the corresponding electrical heater. Changing at least one of a transparency and a polarizing effect of a segment of the segmented visual feedback device may change a visual appearance of an underlying portion of an aerosol-generating article when viewed through the segment. Suitable materials include spirobenzopyran, doped oxides such as $Gd_{(2)}O_{(2)}S$:YbEr, and transparent materials comprising embedded microcrystalline silver halides.

Each electrical heater may comprise an electrically resistive material. Suitable electrically resistive materials include but are not limited to: electrically "conductive" ceramics (such as, for example, molybdenum disilicide), carbon, graphite, metals, metal alloys and composite materials made of a ceramic material and a metallic material. Such composite materials may comprise doped or undoped ceramics. Examples of suitable doped ceramics include doped silicon carbides. Examples of suitable metals include titanium, zirconium, tantalum and metals from the platinum group. Examples of suitable metal alloys include stainless steel, nickel-, cobalt-, chromium-, aluminium-titanium-zirconium-, hafnium-, niobium-, molybdenum-, tantalum-, tungsten-, tin-, gallium-, manganese- and iron-containing alloys, and super-alloys based on nickel, iron, cobalt, stainless steel, Timetal® and iron-manganese-aluminium based alloys. In composite materials, the electrically resistive material may optionally be embedded in, encapsulated or coated with an insulating material or vice-versa, depending on the kinetics of energy transfer and the external physicochemical properties required.

Each electrical heater may comprise an infra-red heating element, a photonic source, or an inductive heating element.

Each electrical heater may comprise a semiconductor heater. Each semiconductor heater may comprise a substrate layer and a heating layer provided on the substrate layer. Each heating layer may be provided on a separate substrate layer. The plurality of semiconductor heaters may comprise a common substrate layer and a plurality of heating layers spaced apart from each other and each provided on the common substrate layer, wherein each heating layer forms a semiconductor heater. Using a common substrate layer may simplify the manufacture of the plurality of semiconductor heaters and the aerosol-generating device. A suitable material for forming the substrate layer is silicon. The substrate layer may be a silicon wafer.

Each heating layer may comprise polycrystalline silicon. Each heating layer may comprise one or more dopants to provide the polycrystalline silicon with a desired electrical resistance. A suitable dopant is phosphorous. Each heating layer may be a substantially continuous layer. Each heating layer may form a pattern on the substrate layer. Providing a heating layer that forms a pattern on the substrate layer may provide a desired temperature distribution across the semiconductor heater during operation of the heater.

The electrical power supply may comprise a direct current (DC) source. In some example embodiments, the electrical power supply comprises a battery. The electrical power supply may comprise a Nickel-metal hydride battery, a Nickel cadmium battery, or a Lithium based battery, for example a Lithium-Cobalt, a Lithium-Iron-Phosphate or a Lithium-Polymer battery.

According to some example embodiments, there is provided an aerosol-generating device comprising an electrical power supply, a housing defining a cavity for receiving an aerosol-generating article, and a plurality of electrical heaters positioned within the cavity. The aerosol-generating device further comprises a controller configured to control a supply of electrical power from the electrical power supply to each of the electrical heaters to sequentially activate the plurality of electrical heaters. The aerosol-generating device also comprises a segmented visual feedback device, wherein each segment of the segmented visual feedback device corresponds to one of the electrical heaters. Each segment of the segmented visual feedback device is configured to provide visual feedback when an aerosol-generating article is received within the cavity and when the corresponding electrical heater has been activated.

Aerosol-generating devices according to some example embodiments include a segmented visual feedback device and a plurality of electrical heaters, including a direct correlation between each segment of the visual feedback device and one of the electrical heaters. This direct correlation may provide a clear visual indication of the level of depletion of an aerosol-forming substrate on an aerosol-generating article being heated with the aerosol-generating device.

Aerosol-generating devices according to some example embodiments include a plurality of sequentially activated electrical heaters. Using a plurality of sequentially activated electrical heaters to heat an aerosol-forming substrate on an aerosol-generating article may facilitate a more accurate estimation or determination of the level of depletion of the aerosol-forming substrate.

The controller is configured to sequentially activate and deactivate the plurality of electrical heaters. The controller may be configured to activate and deactivate the plurality of electrical heaters one at a time. The controller may be configured to activate the plurality of electrical heaters in two or more groups, wherein all of the electrical heaters within a group are activated at the same time. The controller may be configured to activate the next heater or group of heaters after the previous heater or group of heaters has been activated but before the previous heater or group of heaters has been deactivated.

It should be understood that the non-limiting features described herein with respect to one example embodiment may be applied to aerosol-generating devices in accordance with other example embodiments.

According to some example embodiments, there is provided an aerosol-generating article comprising a base layer, at least one aerosol-forming substrate positioned on the base layer, a cover layer overlying the at least one aerosol-forming substrate, and a segmented visual feedback device positioned on the cover layer. Each segment of the segmented visual feedback device overlies a portion of the at least one aerosol-forming substrate. Each segment of the segmented visual feedback device is configured to provide visual feedback when the corresponding portion of the at least one aerosol-forming substrate is heated.

Aerosol-generating articles according to some example embodiments comprise a segmented visual feedback device having a direct correlation between each segment of the segmented visual feedback device and a portion of the at least one aerosol-forming substrate. The direct correlation may provide a clear and accurate visual indication of the level of depletion of the at least one aerosol-forming substrate. This is in contrast to known articles that comprise an indicating means for indicating only when the entire article has already been heated.

The at least one aerosol-forming substrate may be a single aerosol-forming substrate, wherein each segment of the segmented visual feedback device overlies a portion of the single aerosol-forming substrate.

The at least one aerosol-forming substrate may comprise a plurality of discrete aerosol-forming substrates, wherein each segment of the segmented visual feedback device overlies one of the discrete aerosol-forming substrates. Each of the plurality of discrete aerosol-forming substrates may be substantially the same (e.g., same size). At least one of the discrete aerosol-forming substrates may be different from another of the discrete aerosol-forming substrates.

Each segment of the segmented visual feedback device may be configured to exhibit a change in physical appearance of the segment when the segment and the corresponding portion of the at least one aerosol-forming substrate are heated.

At least one segment of the segmented visual feedback device may comprise a thermochromic material configured to exhibit a change in colour when the segment and the corresponding portion of the at least one aerosol-forming substrate are heated. Each of the segments may comprise a thermochromic material, wherein each segment is configured to change from a first colour to a second colour. One of the first and second colours may be colourless. The second colour may be the same for all of the segments. The second colour for at least one of the segments may be different from the second colour for the remaining segments. The second colour for a plurality of the segments may be different from the second colour for the remaining segments. Providing segments configured to exhibit different colour changes can facilitate the segmented visual feedback device displaying an indicia when at least some of the segments have been heated. The indicia may comprise at least one of a graphic, text, a logo, and a brand name. Suitable thermochromic materials include leuco dyes.

At least one segment of the segmented visual feedback device may comprise a thermomechanical material configured to exhibit a change in shape when the segment and the corresponding portion of the at least one aerosol-forming substrate are heated. Each segment comprising a thermomechanical material may be a lens arranged so that the underlying portion of the at least one aerosol-forming substrate is visible through the lens. Each segment may be configured so that, when the segment and the corresponding portion of the at least one aerosol-forming substrate are heated, the shape of the lens is changed. Changing the shape of the lens may change a visual appearance of the underlying portion of the at least one aerosol-forming substrate when viewed through the lens. Examples of suitable thermomechanical materials include thermoresponsive polymers comprising structurally modified polyvinyl alcohol. Suitable structurally modified polyvinyl alcohol includes polyvinyl alcohol that has been at least one of partially acetalized and ionized. Each lens may be formed from a thermomechanical material, such as a thermoresponsive polymer. Each lens may be formed from an optical material, such as glass, and a thermoresponsive polymer coating provided on the optical material.

At least one segment of the segmented visual feedback device may comprise a material configured to exhibit a change in at least one of a transparency of the material and a polarizing effect of the material when the segment and the corresponding portion of the at least one aerosol-forming substrate are heated. Changing at least one of a transparency and a polarizing effect of a segment of the segmented visual feedback device may change a visual appearance of the underlying portion of the at least one aerosol-forming substrate when viewed through the segment. Suitable materials include spirobenzopyran, doped oxides such as $Gd(_2)O(_2)$ S:YbEr, and transparent materials comprising embedded microcrystalline silver halides.

The at least one aerosol-forming substrate may comprise a tobacco-containing material provided on the base layer. The at least one aerosol-forming substrate may comprise a solid aerosol-forming substrate. The at least one aerosol-forming substrate may comprise at least one of herb leaf, tobacco leaf, fragments of tobacco ribs, reconstituted tobacco, homogenized tobacco, extruded tobacco, and expanded tobacco.

In example embodiments in which the at least one aerosol-forming substrate comprises homogenized tobacco, the homogenized tobacco material may be formed by agglomerating particulate tobacco. The homogenized tobacco material may be in the form of a sheet. The homogenized tobacco material may have an aerosol-former content of greater than 5 percent on a dry weight basis. The homogenized tobacco material may have an aerosol-former content of between 5 percent and 30 percent by weight on a dry weight basis. Sheets of homogenized tobacco material may be formed by agglomerating particulate tobacco obtained by grinding or otherwise comminuting one or both of tobacco leaf lamina and tobacco leaf stems. Sheets of homogenized tobacco material may comprise one or more of tobacco dust, tobacco fines, and other particulate tobacco by-products formed during, for example, the treating, handling, and shipping of tobacco. Sheets of homogenized tobacco material may comprise one or more intrinsic binders, that is tobacco endogenous binders, one or more extrinsic binders, that is tobacco exogenous binders, or a combination thereof to help agglomerate the particulate tobacco. Sheets of homogenized tobacco material may comprise other additives including, but not limited to, tobacco and non-tobacco fibres, aerosol-formers, humectants, plasticisers, flavourants, fillers, aqueous and non-aqueous solvents, and combinations thereof. Sheets of homogenized tobacco material may be formed by a casting process of the type generally comprising casting a slurry comprising particulate tobacco and one or more binders onto a conveyor belt or other support surface, drying the cast slurry to form a sheet of homogenized tobacco material, and removing the sheet of homogenized tobacco material from the support surface.

The at least one aerosol-forming substrate may include at least one aerosol-former. Suitable aerosol-formers include, but are not limited to: polyhydric alcohols, such as propylene glycol, triethylene glycol, 1,3-butanediol and glycerine; esters of polyhydric alcohols, such as glycerol mono-, di- or triacetate; and aliphatic esters of mono-, di- or polycarboxylic acids, such as dimethyl dodecanedioate and dimethyl tetradecanedioate Suitable aerosol formers include polyhydric alcohols or mixtures thereof, such as propylene glycol, triethylene glycol, 1,3-butanediol, and glycerine.

The at least one aerosol-forming substrate may comprise a single aerosol former. The at least one aerosol-forming substrate may comprise a combination of two or more aerosol formers.

In example embodiments in which the at least one aerosol-forming substrate comprises a plurality of discrete aerosol-forming substrates, at least one of the discrete aerosol-forming substrates may comprise a porous carrier material and a liquid nicotine source sorbed onto the porous carrier material.

The porous carrier material may have a density of between about 0.1 grams/cubic centimetre and about 0.3 grams/cubic centimetre.

The porous carrier material may have a porosity of between about 15 percent and about 55 percent.

The porous carrier material may comprise one or more of glass, cellulose, ceramic, stainless steel, aluminium, polyethylene (PE), polypropylene, polyethylene terephthalate (PET), poly(cyclohexanedimethylene terephthalate) (PCT), polybutylene terephthalate (PBT), polytetrafluoroethylene (PTFE), expanded polytetrafluoroethylene (ePTFE), and BAREX®.

The porous carrier material may be chemically inert with respect to the liquid aerosol-forming substrate.

The liquid nicotine source may comprise one or more of nicotine, nicotine base, a nicotine salt, such as nicotine-HCl, nicotine-bitartrate, or nicotine-ditartrate, or a nicotine derivative.

The nicotine source may comprise natural nicotine or synthetic nicotine.

The nicotine source may comprise pure nicotine, a solution of nicotine in an aqueous or non-aqueous solvent or a liquid tobacco extract.

The nicotine source may comprise an electrolyte forming compound. The electrolyte forming compound may be selected from the group consisting of alkali metal hydroxides, alkali metal oxides, alkali metal salts, alkaline earth metal oxides, alkaline earth metal hydroxides, and combinations thereof.

The nicotine source may comprise an electrolyte forming compound selected from the group consisting of potassium hydroxide, sodium hydroxide, lithium oxide, barium oxide, potassium chloride, sodium chloride, sodium carbonate, sodium citrate, ammonium sulfate, and combinations thereof.

The nicotine source may comprise an aqueous solution of nicotine, nicotine base, a nicotine salt or a nicotine derivative and an electrolyte forming compound.

The nicotine source may comprise other components including, but not limited to, natural flavours, artificial flavours, and antioxidants.

At least one of the discrete aerosol-forming substrates may comprise the porous carrier material and the nicotine source sorbed onto the porous carrier material, and at least one of the discrete aerosol-forming substrates may comprise a porous carrier material and an acid source sorbed onto the porous carrier material. During use, volatile compounds from the nicotine source and the acid source may react in the gas phase to form an aerosol comprising nicotine salt particles.

The acid source may comprise an organic acid or an inorganic acid. In a non-limiting embodiment, the organic acid may be a carboxylic acid (e.g., an alpha-keto or 2-oxo acid or lactic acid).

In some example embodiments, the acid source comprises an acid selected from the group consisting of 3-methyl-2-oxopentanoic acid, pyruvic acid, 2-oxopentanoic acid, 4-methyl-2-oxopentanoic acid, 3-methyl-2-oxobutanoic acid, 2-oxooctanoic acid, lactic acid, and combinations thereof. For instance, the acid source may comprise pyruvic acid or lactic acid. In another instance, the acid source may comprise lactic acid.

BRIEF DESCRIPTION OF THE DRAWINGS

The various features and advantages of the non-limiting embodiments herein may become more apparent upon review of the detailed description in conjunction with the accompanying drawings. The accompanying drawings are merely provided for illustrative purposes and should not be interpreted to limit the scope of the claims. The accompanying drawings are not to be considered as drawn to scale unless explicitly noted. For purposes of clarity, various dimensions of the drawings may have been exaggerated.

DETAILED DESCRIPTION

Figure 1:
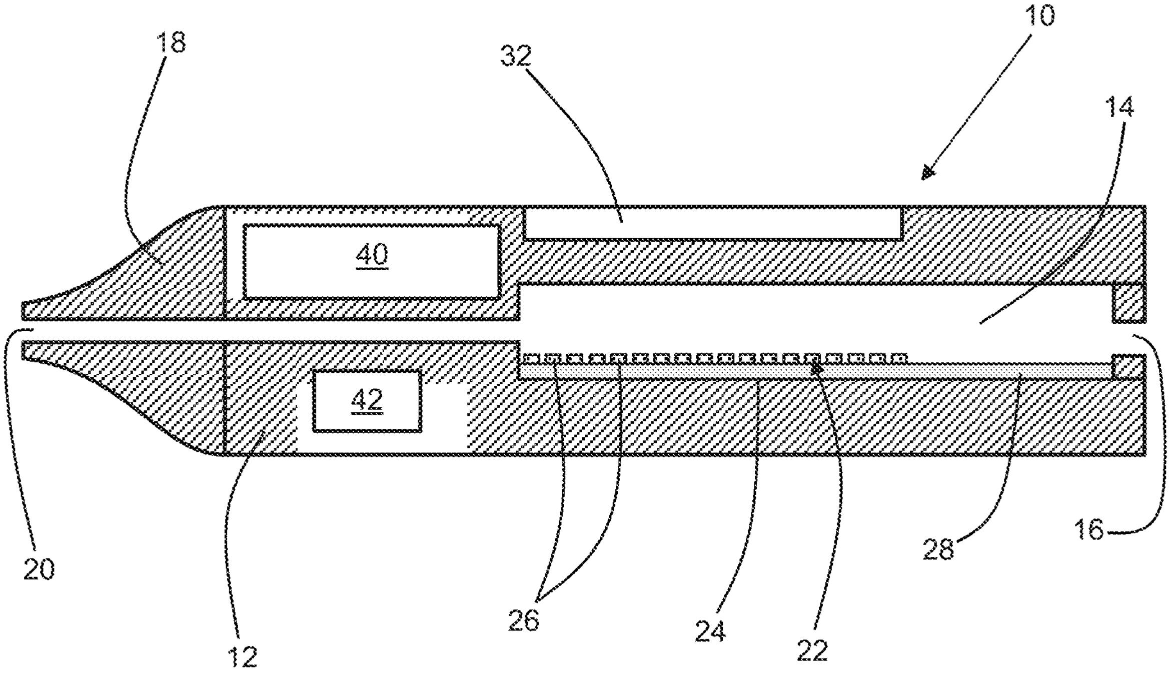
FIG. 1 shows a cross-sectional view of an aerosol-generating device according to an example embodiment.

It should be understood that when an element or layer is referred to as being "on," "connected to," "coupled to," or "covering" another element or layer, it may be directly on, connected to, coupled to, or covering the other element or layer or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the term "and/or" includes any and all combinations of one or more of the associated listed items.

It should be understood that, although the terms first, second, third, etc. may be used herein to describe various elements, components, regions, layers and/or sections, these elements, components, regions, layers, and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of example embodiments.

Spatially relative terms (e.g., "beneath," "below," "lower," "above," "upper," and the like) may be used herein for ease of description to describe one element or feature's relationship to another element(s) or feature(s) as illustrated in the figures. It should be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various embodiments only and is not intended to be limiting of example embodiments. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which example embodiments belong. It will be further understood that terms, including those defined in commonly used dictionaries, should be interpreted as having a meaning that is consistent with their meaning in the context of the relevant art and will not be interpreted in an idealized or overly formal sense unless expressly so defined herein.

FIG. 1 shows a cross-sectional view of an aerosol-generating device 10 according to an example embodiment. The aerosol-generating device 10 comprises a housing 12 defining a cavity 14 for receiving an aerosol-generating article. An air inlet 16 is provided at an upstream end of the cavity 14 and a mouthpiece 18 is provided at a downstream end of the housing 12. An air outlet 20 is provided in the mouthpiece 18 in fluidic communication with the cavity 14 so that an airflow path is defined through the cavity 14 between the air inlet 16 and the air outlet 20. During vaping, a negative pressure is applied to the mouthpiece 18 to draw air into the cavity 14 through the air inlet 16 and out of the cavity 14 through the air outlet 20.

The aerosol-generating device 10 further comprises a plurality of electrical heaters 22 provided on a planar wall 24 of the cavity 14. Each of the electrical heaters 22 comprises a heater element 26 provided on a common support layer 28. The plurality of electrical heaters 22 form a heater array 30, which is shown more clearly in FIG. 2.

Figure 2:
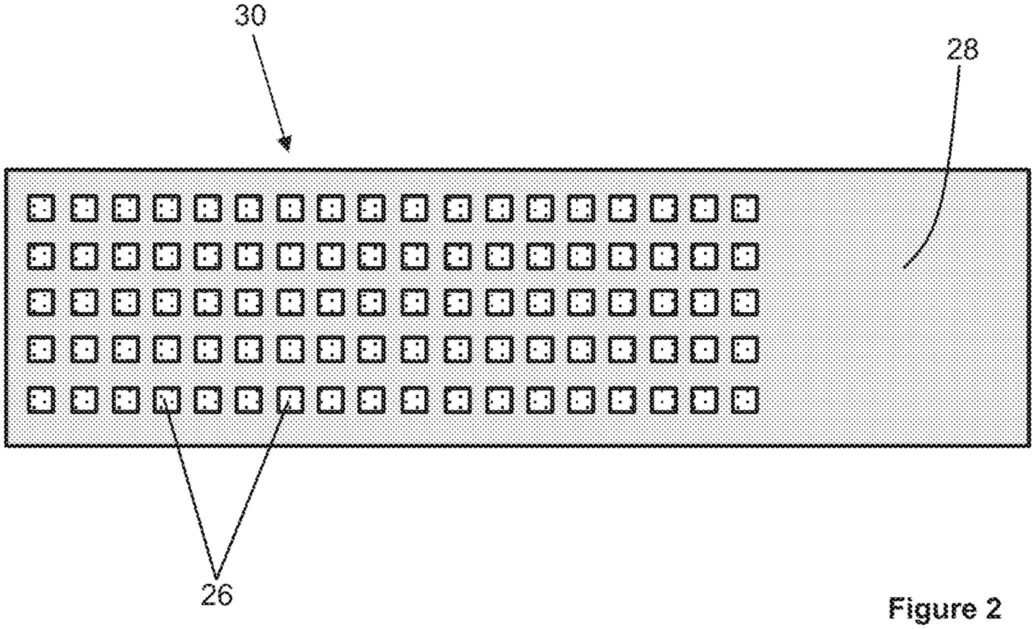
FIG. 2 shows a top view of the plurality of electrical heaters of the aerosol-generating device of FIG. 1.
Figure 3:
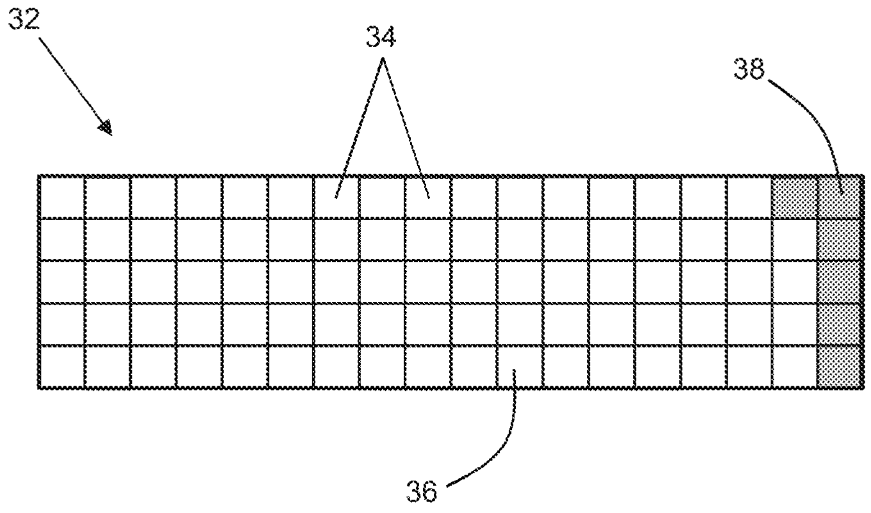
FIG. 3 shows a top view of the segmented visual feedback device of the aerosol-generating device of FIG. 1.

The aerosol-generating device 10 also comprises a segmented visual feedback device 32, which is shown more clearly in FIG. 3. In an example embodiment, the segmented visual feedback device 32 comprises a plurality of segments 34 arranged in an array having the same pattern as the heater array 30. In the example embodiments shown in FIGS. 1 to 3, each segment 34 comprises a blue LED, a red LED, and a green LED so that each segment 34 can be illuminated in a variety of different colours.

The aerosol-generating device 10 further comprises an electrical power supply 40 and a controller 42 positioned within the housing 12. When an aerosol-generating article is received within the cavity 14, the controller 42 controls a supply of electrical current from the electrical power supply 40 to each electrical heater 22 to activate the electrical heater 22. In an example embodiment, the controller 42 is configured to activate the plurality of electrical heaters 22 in groups, with each group being activated and deactivated sequentially. The controller 42 is also configured to switch each of the segments 34 of the segmented visual feedback device 32 from a first condition 36 to a second condition 38 when the corresponding electrical heater 22 in the heater array 30 is activated. In the first condition 36, each segment 34 may be switched off, and in the second condition 38 each segment 34 may be switched on and illuminated in a first colour. When all of the electrical heaters 22 have been activated, the controller 42 is configured to switch all of the segments 34 of the segmented visual feedback device 32 to a third condition. In the third condition, all of the segments 34 may be switched on and illuminated in a second colour that is different from the first colour. When the aerosol-generating article is removed from the cavity 14 and a new aerosol-generating article is inserted into the cavity 14, the controller 42 resets all of the segments 34 to the first condition.

Figure 4:
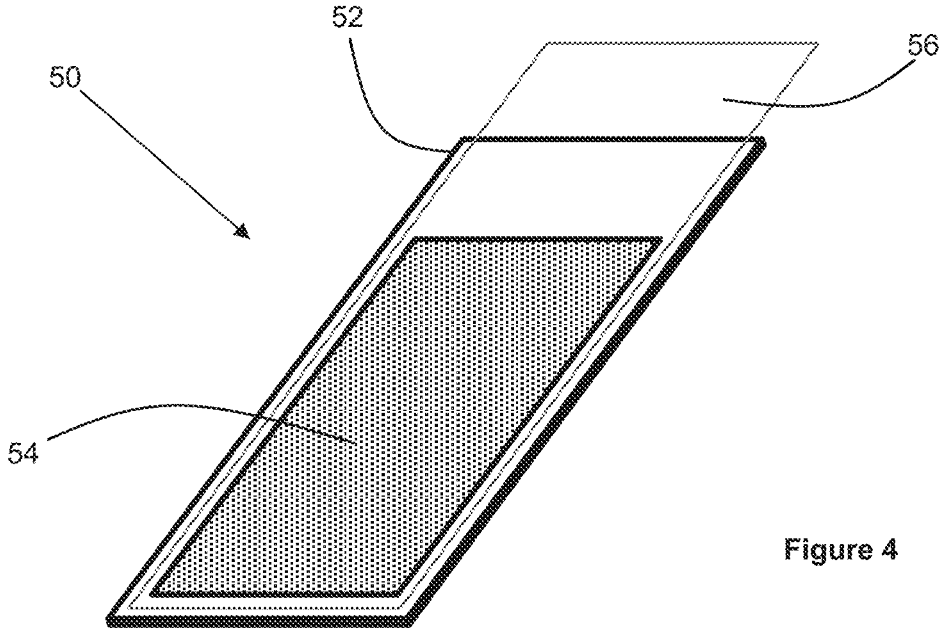
FIG. 4 shows a perspective view of an example embodiment of an aerosol-generating article for use with the aerosol-generating device of FIG. 1.

FIG. 4 shows an aerosol-generating article 50 for use with the aerosol-generating device 10 of FIGS. 1 to 3. The aerosol-generating article 50 comprises a base layer 52 and an aerosol-forming substrate 54 provided on the base layer 52. In an example embodiment, the aerosol-forming substrate 54 comprises a substantially continuous layer of a solid tobacco-containing material. A removable cover layer 56 is secured to the base layer 52 to seal the aerosol-forming substrate 54 between the base layer 52 and the removable cover layer 56. The removable cover layer 56 may be formed from a non-porous polymeric film.

During use, the removable cover layer 56 is removed from the base layer 52 and the aerosol-generating article 50 is inserted into the cavity 14 of the aerosol-generating device 10 shown in FIG. 1 to form an aerosol-generating system. The controller 42 then sequentially activates and deactivates groups of the electrical heaters 22 to sequentially heat discrete portions of the aerosol-forming substrate 54. Each time an electrical heater 22 is activated, the controller 42 switches the corresponding segment 34 of the segmented visual feedback device 32 into the second condition to indicate that the corresponding portion of the aerosol-forming substrate 54 has been depleted. In this way, the segmented visual feedback device 32 provides a clear indication of the level of depletion of the aerosol-forming substrate 54.

Figure 5:
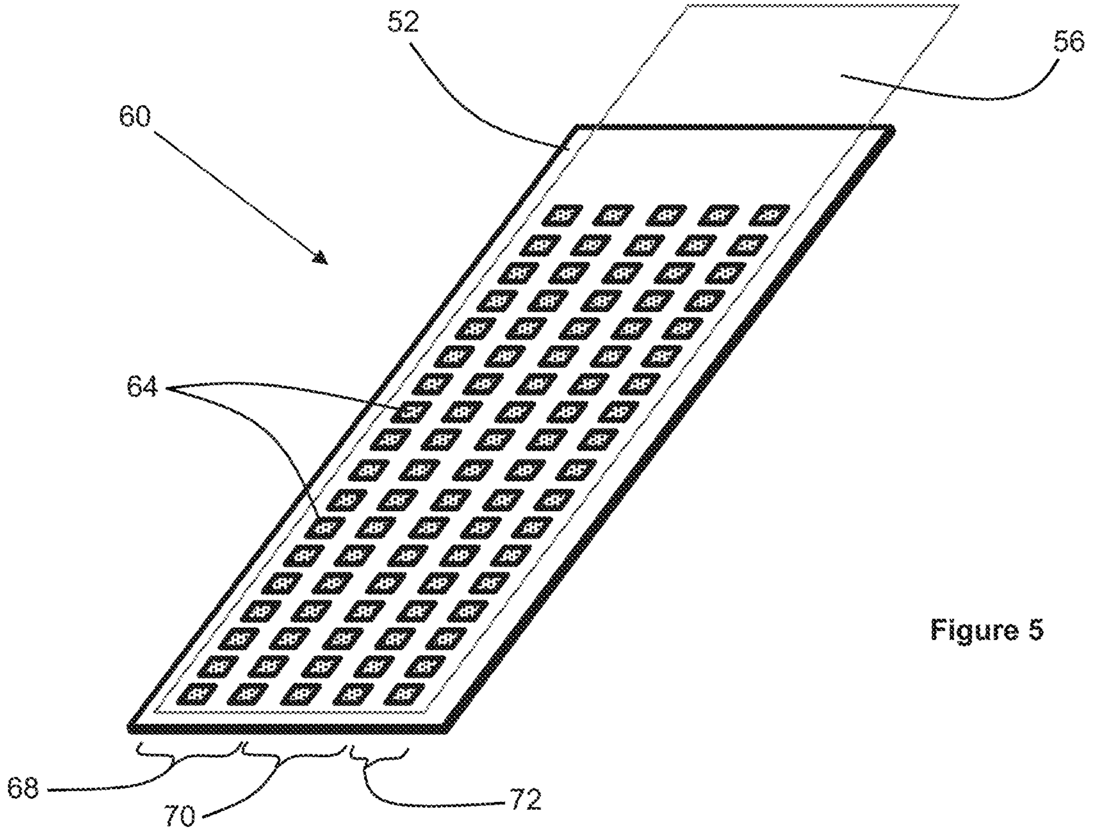
FIG. 5 shows a perspective view of another example embodiment of an aerosol-generating article for use with the aerosol-generating device of FIG. 1.

FIG. 5 shows another aerosol-generating article 60 for use with the aerosol-generating device 10 of FIGS. 1 to 3. The aerosol-generating article 60 comprises a base layer 52 and a cover layer 56 identical to the base layer 52 and the cover layer 56 of the aerosol-generating article 50 shown in FIG. 4. However, the aerosol-generating article 60 comprises a plurality of discrete aerosol-forming substrates 64 positioned on the base layer 52 and sealed between the base layer 52 and the cover layer 56. Each of the aerosol-forming substrates 64 may comprise a porous substrate material and a liquid aerosol-forming substrate sorbed onto the porous substrate material.

In an example embodiment, the plurality of aerosol-forming substrates 64 is divided into three groups: a plurality of first aerosol-forming substrates 68 each comprising a liquid nicotine solution; a plurality of second aerosol-forming substrates 70 each comprising a volatile acid; and a plurality of third aerosol-forming substrates 72 each comprising a flavourant.

Figure 6:
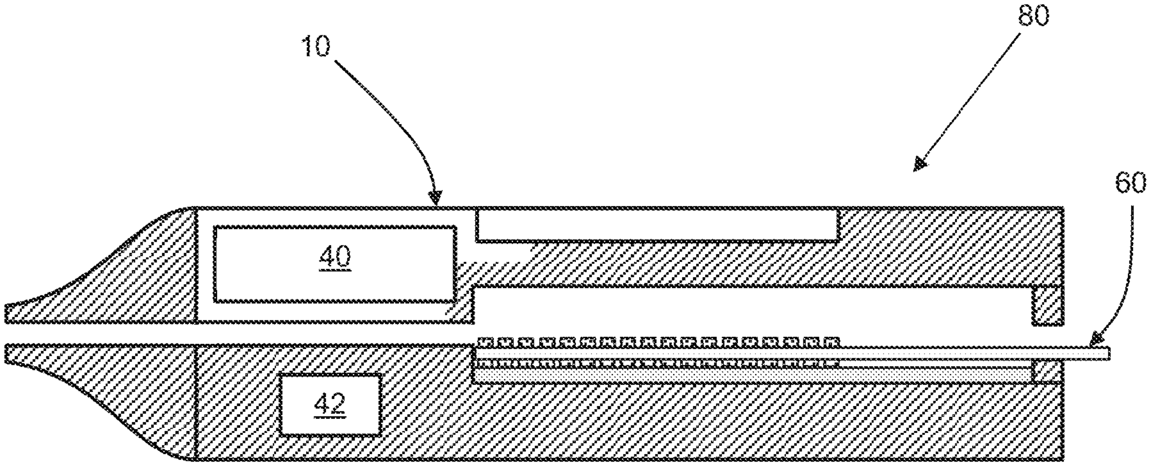
FIG. 6 shows a cross-sectional view of the aerosol-generating article of FIG. 5 combined with the aerosol-generating device of FIG. 1 to form an aerosol-generating system.

During use, the removable cover layer 56 is removed from the base layer 52 and the aerosol-generating article 60 is inserted into the cavity 14 of the aerosol-generating device 10 shown in FIG. 1 to form an aerosol-generating system 80, as shown in FIG. 6. In an example embodiment, the arrangement of the aerosol-forming substrates 64 is such that each aerosol-forming substrate 64 overlies an electrical heater 22 when the aerosol-generating article 60 is received within the cavity 14.

The controller 42 then sequentially activates and deactivates groups of the electrical heaters 22 to sequentially heat the discrete aerosol-forming substrates 64. At each stage of the sequential activation, the controller 42 activates the appropriate electrical heaters 22 to simultaneously heat one of the first aerosol-forming substrates 68, one of the second aerosol-forming substrates 70, and one of the third aerosol-forming substrates 72. The nicotine vapour released from the heated first aerosol-forming substrate 68 and the acid vapour released from the heated second aerosol-forming substrate 70 react in the gas phase to form an aerosol comprising nicotine salt particles for delivery through the air outlet 20. The flavourant released from the heated third aerosol-forming substrate 72 imparts a flavour to the aerosol.

Each time an electrical heater 22 is activated, the controller 42 switches the corresponding segment 34 of the segmented visual feedback device 32 into the second condition to indicate that the corresponding discrete aerosol-forming substrate 64 has been depleted. In this way, the segmented visual feedback device 32 provides a clear indication of the level of depletion of the plurality of discrete aerosol-forming substrates 64.

Figure 7:
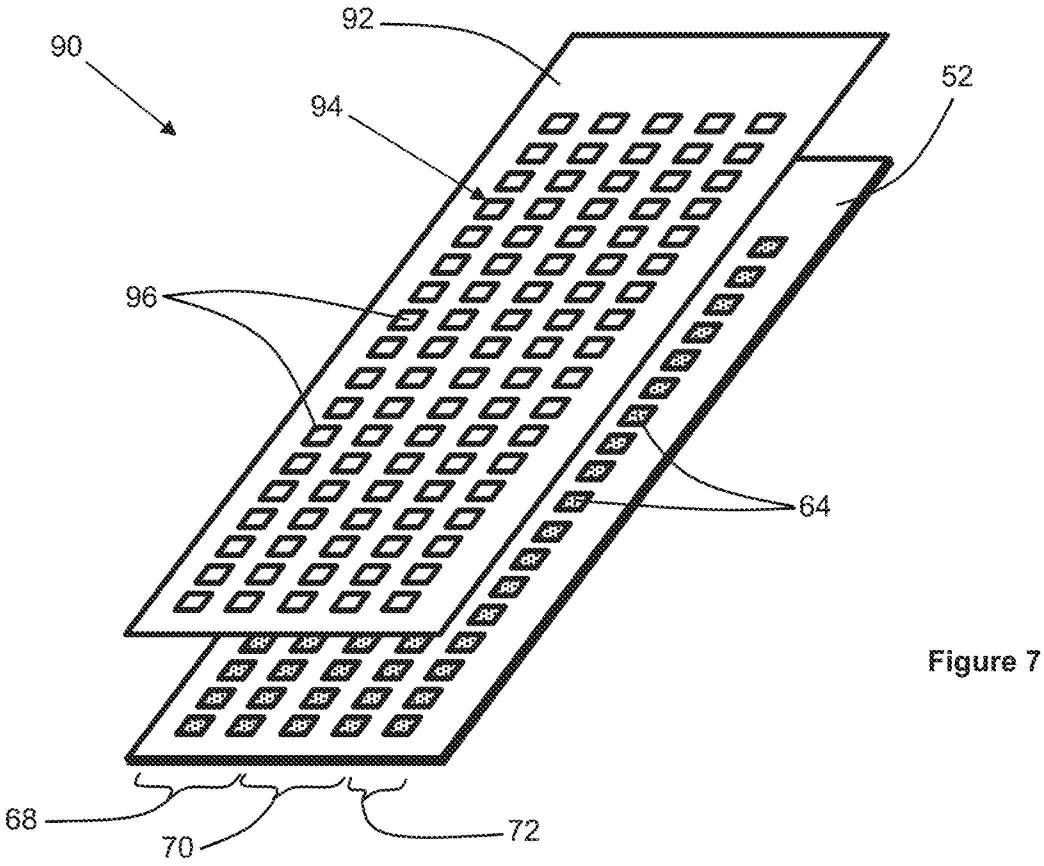
FIG. 7 shows a perspective exploded view of an aerosol-generating article in accordance with an example embodiment.

FIG. 7 shows an exploded view of an aerosol-generating article 90 according to an example embodiment. The aerosol-generating article 90 comprises a base layer 52 and a plurality of discrete aerosol-forming substrates 64 that are identical to the base layer 52 and aerosol-forming substrates 64 of the aerosol-generating article 60 shown in FIG. 5. Therefore, like reference numerals are used to designate like parts.

The aerosol-generating article 90 comprises a cover layer 92 attached to the base layer 52 and overlying the plurality of discrete aerosol-forming substrates 64. A segmented visual feedback device 94 is positioned on the cover layer 92, the segmented visual feedback device 94 comprising a plurality of segments 96. In an example embodiment, the pattern formed by the plurality of segments 96 is identical to the pattern formed by the plurality of discrete aerosol-forming substrates 64 so that each segment 96 overlies a discrete aerosol-forming substrate 64.

Each of the segments 96 of the segmented visual feedback device 94 may comprise a material that exhibits a change in the appearance of the material when heated. For example, each segment 96 may comprise at least one of a thermomechanical material, a thermochromic material, a material configured to exhibit a change in transparency when heated, and a material configured to exhibit a change in a polarizing effect of the material when heated.

Figure 8:
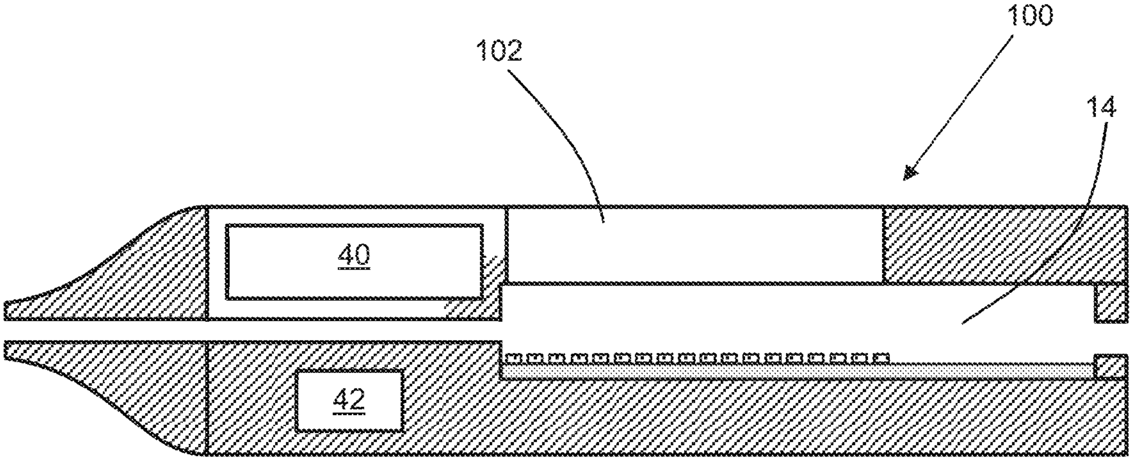
FIG. 8 shows a cross-sectional view of an aerosol-generating device for use with the aerosol-generating article of FIG. 7.

FIG. 8 shows a cross-sectional view of an aerosol-generating device 100 for use with the aerosol-generating article 90 of FIG. 7. The aerosol-generating device 100 is substantially the same in construction and operation as the aerosol-generating device 10 of FIGS. 1 to 3, and like reference numerals designate like parts. The aerosol-generating device 100 comprises a transparent window 102 instead of a segmented visual feedback device 32 (like in FIG. 1). The transparent window 102 is positioned so that it overlies the segmented visual feedback device 94 of the aerosol-generating article 90 when the aerosol-generating article 90 is received within the cavity 14. When the aerosol-generating article 90 is received within the cavity 14, the controller 42 sequentially activates the electrical heaters 22 to sequentially heat the plurality of discrete aerosol-forming substrates 64, as described with reference to FIG. 6. When each of the discrete aerosol-forming substrates 64 is heated, the heat causes the material of the corresponding segment 96 of the segmented visual feedback device 94 to exhibit a change in appearance. The change in appearance of each segment 96 can be observed through the transparent window 102, and in this way the segmented visual feedback device 94 provides a clear indication of the level of depletion of the plurality of discrete aerosol-forming substrates 64.

While a number of example embodiments have been disclosed herein, it should be understood that other variations may be possible. Such variations are not to be regarded as a departure from the spirit and scope of the present disclosure, and all such modifications as would be obvious to one skilled in the art are intended to be included within the scope of the following claims.

The invention claimed is:

1. An aerosol-generating device comprising:

a plurality of heaters configured to heat a corresponding portion of at least one aerosol-forming article, the plurality of heaters including a plurality of groups of heaters, each of the plurality of groups of heaters including a subset of heaters of the plurality of heaters; and a controller configured to sequentially activate the plurality of heaters to heat corresponding portions of the aerosol-forming article and generate an aerosol, the sequentially activating the plurality of heaters including sequentially activating the plurality of groups of heaters.

2. The aerosol-generating device of claim 1, wherein the plurality of heaters includes at least one of an infrared heating element, a photonic source, an inductive heating element, a semiconductor heater, or any combinations thereof.

3. The aerosol-generating device of claim 1, further comprising:

a display including a plurality of segments; and the controller is further configured to control each of the plurality of segments of the display based on a status of at least one corresponding heater to a respective segment.

4. The aerosol-generating device of claim 3, further comprising:

a housing configured to receive the at least one aerosol-forming article, the at least one aerosol-forming article including a plurality of discrete aerosol-forming substrates; and the controller is further configured to, determine a status of the housing with regard to whether the housing has received the at least one aerosol-forming article; and control each of the plurality of segments of the display based on the status of the at least one corresponding heater and the status of the housing.

5. The aerosol-generating device of claim 3, wherein the controller is further configured to control each of the plurality of segments by changing a brightness of a respective segment based on the status of the at least one corresponding heater.

6. The aerosol-generating device of claim 3, wherein the controller is further configured to control each of the plurality of segments by changing a color of a respective segment based on the status of the at least one corresponding heater.

7. The aerosol-generating device of claim 3, wherein the controller is further configured to control each of the plurality of segments by changing a shape of a respective segment based on the status of the at least one corresponding heater.

8. The aerosol-generating device of claim 7, wherein each of the plurality of segments includes:

a lens; and a piezoelectric actuator configured to change a shape of the lens based on instructions from the controller.

9. The aerosol-generating device of claim 7, wherein each of the plurality of segments includes:

a lens including a thermomechanical material; and the lens is configured to change shape when heated by the at least one corresponding heater.

10. The aerosol-generating device of claim 9, wherein the thermomechanical material is a thermoresponsive polymer.

11. The aerosol-generating device of claim 1, wherein the controller is further configured to sequentially activate the plurality of groups of heaters based on a desired period of time corresponding to each group of heaters.

12. A method of operating an aerosol-generating device, the method comprising:

sequentially activating, using a controller of the aerosol-generating device, a plurality of heaters to heat a corresponding portion of an aerosol-forming article, the plurality of heaters including a plurality of groups of heaters, each of the plurality of groups of heaters including a subset of heaters of the plurality of heaters, and the sequentially activating the plurality of heaters including sequentially activating the plurality of groups of heaters.

13. The method of claim 12, wherein the plurality of heaters includes at least one of an infrared heating element, a photonic source, an inductive heating element, a semiconductor heater, or any combinations thereof.

14. The method of claim 12, further comprising:

controlling, using the controller, a display of the aerosol-generating device, the display including a plurality of segments, the controlling including controlling a display of each segment of the plurality of segments based on a status of at least one corresponding heater of the plurality of heaters.

15. The method of claim 14, further comprising:

controlling, using the controller, the display of each of the plurality of segments by changing a brightness of a respective segment based on the status of the at least one corresponding heater.

16. The method of claim 14, further comprising:

controlling, using the controller, the display of each of the plurality of segments by changing a color of a respective segment based on the status of the at least one corresponding heater.

17. The method of claim 14, further comprising:

controlling, using the controller, the display of each of the plurality of segments by changing a shape of a respective segment based on the status of the at least one corresponding heater.

18. The method of claim 14, wherein each of the plurality of segments includes, a lens, and a piezoelectric actuator; and the method further includes, changing a shape of the lens using the piezoelectric actuator.

19. The method of claim 14, wherein each of the plurality of segments includes:

a lens including a thermomechanical material; and the method further includes, changing a shape of the lens using the at least one corresponding heater.

20. The method of claim 19, wherein the thermomechanical material is a thermoresponsive polymer.

* * * * *